United States Patent [19]

Reinwall

[11] Patent Number: 4,875,818
[45] Date of Patent: Oct. 24, 1989

[54] SCREW HAVING A SEALING WASHER
[75] Inventor: Ernest W. Reinwall, McHenry, Ill.
[73] Assignee: Elco Industries, Inc., Rockford, Ill.
[21] Appl. No.: 770,294
[22] Filed: Aug. 27, 1985

Related U.S. Application Data

[63] Continuation of Ser. No. 556,555, Nov. 30, 1983, abandoned.

[51] Int. Cl.[4] .............................................. F16B 33/00
[52] U.S. Cl. .................................... 411/369; 411/371; 411/542
[58] Field of Search ................ 411/301, 302, 303, 369, 411/368, 371, 542, 544, 82, 258, 372, 432, 512, 531, 533, 915, 900, 901, 902, 903, 907, 908, 377; 152/430

[56] References Cited

U.S. PATENT DOCUMENTS

| | | |
|---|---|---|
| 951,437 | 3/1910 | Gehrke . |
| 1,094,164 | 4/1914 | Nold ............................. 152/430 X |
| 1,393,459 | 10/1921 | Smith ............................. 411/435 |
| 1,512,896 | 10/1924 | Kraft ............................. 411/432 |
| 1,675,990 | 7/1928 | Payne ............................. 152/430 |
| 1,814,502 | 7/1931 | Barwood . |
| 2,761,347 | 9/1956 | McKee . |
| 3,203,459 | 8/1965 | Coldren ............................. 411/303 X |
| 3,241,422 | 3/1966 | Heimovics . |
| 3,275,054 | 9/1966 | Ohl ............................. 411/302 |
| 3,399,589 | 9/1968 | Breed ............................. 411/369 X |
| 3,452,636 | 7/1969 | Cohen et al. ............................. 411/369 |
| 3,500,712 | 3/1970 | Wagner ............................. 411/915 |
| 3,541,918 | 11/1970 | Johnson . |
| 3,606,357 | 9/1971 | Yonkers ............................. 411/371 X |
| 3,678,979 | 7/1972 | Bjorklund . |
| 3,788,185 | 1/1974 | Gutshall . |
| 3,803,972 | 4/1974 | Deutsher . |
| 4,103,725 | 8/1978 | Abe . |
| 4,292,876 | 10/1981 | Degraan ............................. 411/542 |
| 4,367,060 | 1/1983 | Berecz ............................. 411/303 |
| 4,749,321 | 6/1988 | Knohl et al. ............................. 411/369 X |

FOREIGN PATENT DOCUMENTS 1047764 11/1963 United Kingdom .
1031583 11/1964 United Kingdom .
1023245 12/1964 United Kingdom .

Primary Examiner—Gary L. Smith
Assistant Examiner—Curtis B. Brueske
Attorney, Agent, or Firm—Leydig, Voit & Mayer, Ltd.

[57] ABSTRACT

A fastener includes a threaded shank with a driving head on one end and a washer of resiliently yieldable material encircling the shank and disposed beneath the head to be compressed between the latter and a workpiece as the shank is driven into the workpiece. The head includes a skirt engaging the washer, the underside of the skirt being concave and being formed with an annular rib. As the washer is compressed, the rib exerts a downward force and produces a sealing circle between the washer and the workpiece. At the same time, the inner side of the rib forces the washer downwardly and inwardly to form a seal around the shank. The outer side of the rib forces the washer downwardly and outwardly against a flange on the periphery of the skirt, the flange trapping and retaining the washer in the space defined by the underside of the skirt.

2 Claims, 1 Drawing Sheet

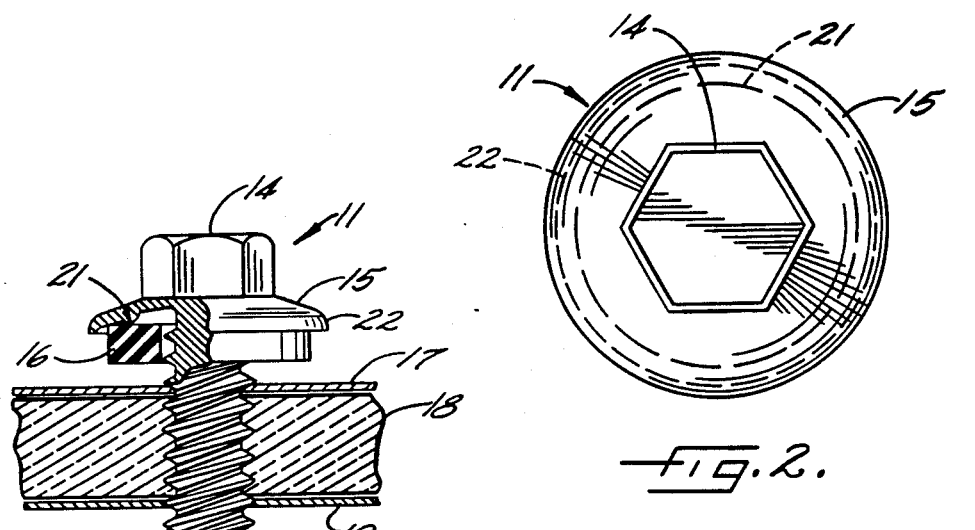
Fig. 2.
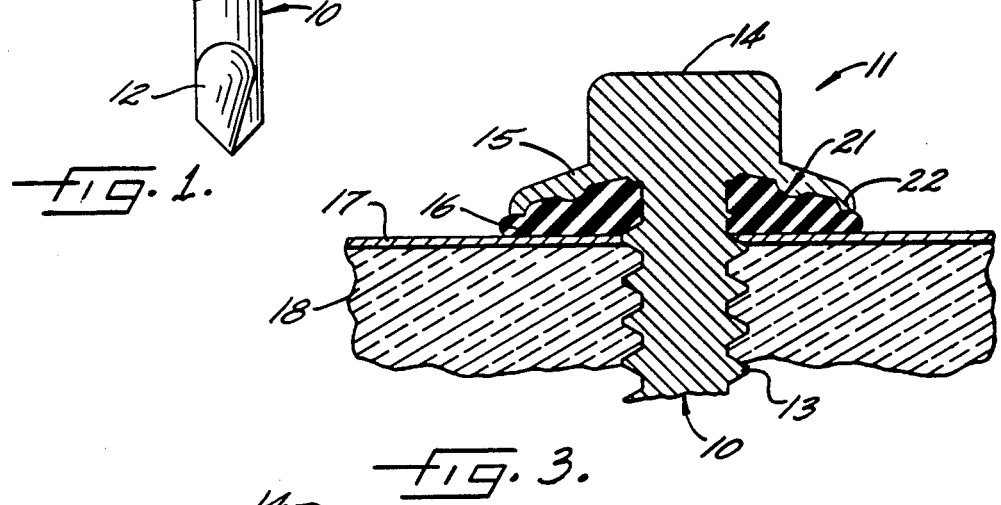
Fig. 1.
Fig. 3.
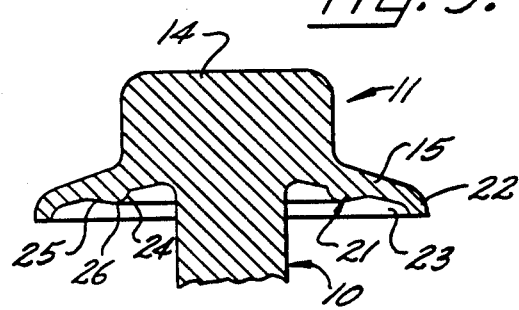
Fig. 4.

SCREW HAVING A SEALING WASHER

CROSS-REFERENCE TO A RELATED APPLICATION

This application is a continuation of my application Ser. No. 556,555, filed Nov. 30, 1983 and now abandoned.

BACKGROUND OF THE INVENTION

This invention relates to a fastener such as a screw having an elongated threaded shank and a driving head coaxial with the shank on the upper end thereof. A washer of resiliently yieldable material encircles the shank and is disposed beneath the head so as to be compressed between the head and a workpiece and form a seal around the shank.

SUMMARY OF THE INVENTION

The general object of the invention is to provide a new and improved fastener of the foregoing type which provides a good seal even though the driving torque applied to the fastener may vary substantially from generally accepted standards and which also provides an effective seal even though the shank is not driven precisely perpendicular to the workpiece.

A more detailed object is to achieve the foregoing by making the underside of the head concave and by forming an annular rib on the underside to cause the washer to exert a downward sealing force against the workpiece around a sealing ring, to cause the washer to exert an inward sealing force around the shank and to cause the washer to be forced toward a peripheral flange on the head, the flange trapping the washer as it is compressed and retaining the washer substantially within the confines of the head.

BRIEF DESCRIPTION OF THE DRAWINGS

FIG. 1 is a side elevational view of a fastener embodying the invention, parts being broken away and shown in section.

FIG. 2 is an enlarged top view.

FIG. 3 is an enlarged longitudinal sectional view of the fastener after it has been driven into a workpiece.

FIG. 4 is an enlarged longitudinal sectional view of the head and the adjacent portion of the shank.

DETAILED DESCRIPTION OF THE PREFERRED EMBODIMENT

As shown in the drawings for purposes of illustration, the invention is embodied in a threaded fastener in the form of a self-tapping screw. In general, the latter includes an elongated shank 10 and a driving head 11 coaxial with the shank on the upper end thereof, the shank and the head herein being formed integrally with each other. The lower end of the shank is a drilling tip 12 and, between this tip and the head, the shank is threaded as indicated at 13. The head includes a driving portion 14 which is adapted to receive a driving tool and which, in this instance, has a hexagonal periphery for engagement with a socket wrench or the like. Surrounding the inner end of the driving portion is a circular head or skirt portion 15 and beneath the latter is an annular washer 16 encircling the shank. The washer is resiliently yieldable and may be made of such materials as rubber and polyvinyl chloride. As shown in FIG. 1, the preferred washer in an uncompressed state is a cylindrical disc with planar upper and lower ends.

Such a fastener may be used with a variety of workpieces and among its uses is the securing of a steel roof panel 17 and a blanket 18 of insulation to a sheet metal purlin 19 of a building. In such a case, the tip 12 drills through the roof panel, the blanket and the purlin and is followed by the thread 13 which draws the head 11 down toward the roof panel. This results in the washer 16 being compressed between the skirt 15 and the panel to seal the latter around the shank 10.

The present invention contemplates the provision of a novel fastener which, as compared to prior fasteners, insures a better seal by the washer 16 even though there are comparatively wide variations in the torque applied to the fastener and which provides such a seal regardless of whether the shank 10 of the fastener is perpendicular to the workpiece or is driven in at a slight angle. In addition, the fastener traps the washer beneath the head 11 and prevents a condition known as ring-out, that is, the spreading of a substantial portion of the washer beyond the periphery of the skirt. To these ends, an annular rib 21 is formed on the underside of the head and the rib exerts a downward force to produce a sealing circle in the washer around the shank 10 while, at the same time, the rib forces a substantial portion of the washer radially inwardly toward the shank. Further, a peripheral flange 22 on the head traps the washer to prevent ringout.

Herein, the rib 21 is formed on the underside of the skirt 15 and is spaced radially outwardly from the shank 10, being disposed about midway between the shank and the flange 22. The underside of the skirt is concave and is generally conical in shape and the outer periphery of the skirt merges with the flange which depends longitudinally of the shank whereby the flange, with the skirt, forms a space or pocket 23 (FIG. 4) to receive the washer 16. As shown in FIG. 1, the natural diameter of the washer is greater than the diameter of the rib but less than the diameter of the flange so that the rib engages the end of the washer but the washer is disposed completely beneath the pocket 23 and is spaced from the underside of the skirt except at the extreme outer periphery of the washer. The rib divides the pocket 23 into an inner cavity 23a and an outer cavity 23b (FIG. 4).

The inner side 24 (FIG. 4) of the rib 21 is disposed at an acute angle relative to a plane transverse of the shank 10 and this angle is a working angle in the sense that the attitude of the inner side is such that the latter effectively forces washer material inwardly toward the shank and into the inner cavity 23a as the washer is compressed between the skirt and the workpiece. An angle of about 60 degrees has been found satisfactory. The outer side 25 of the rib is disposed at a smaller angle to this plane and, basically, this angle helps define a nose 26 on the rib. An angle on the order of 10 to 15 degrees is appropriate for the side 25. When the washer is compressed, the outer side of the rib forces washer material into the outer cavity 23b and against the flange 22 as shown in FIG. 3.

With a fastener of the foregoing type, the driving portion 14 of the head 11 is engaged by a driving tool, which usually is power operated, and the drill tip 12 is driven through the roof panel 17, the insulation blanket 18 and the purlin 19. As the thread 13 comes into engagement with the sheet metal portions, it pulls the head toward the roof panel. Upon initial engagement with the latter by the washer 16, the nose 26 of the rib 21 begins to exert a downward force and causes a small circular area or ring of the washer below the rib to be in sealing engagement with the roof panel. As the shank is threaded further into the roof assembly, the nose continues to exert a downward force around the sealing ring and the inclined inner side 24 of the rib begins to exert a downward and inward force so that the washer conforms to the shape of the inner cavity 23a and seals snugly against both the shank and the roof panel. During the final tightening of the fastener, the skirt 15 further compresses the washer as shown in FIG. 3 and the inclined outer side 25 of the rib forces the washer material outwardly into the outer cavity 23b and against the flange 22 but the flange essentially traps and retains the washer in the cavity 23b. It has been found that such a fastener produces an effective seal even though there is a wide variation from the standard torque customarily applied to the head 11. Moreover, the seal is effected and maintained even though the shank may not enter the roof panel in exactly a perpendicular direction.

I claim:

1. A fastener adapted to be driven into a workpiece and comprising an elongated and externally threaded shank, a head of generally circular cross-section integral with one end of said shank and generally coaxial with the shank, the underside of said head being concave, an annular flange depending from the outer periphery of said head and disposed at an angle relative to the underside of the head, the underside of said head being substantially frustoconical across substantially the entire span extending from the inner periphery of said flange to the outer periphery of said shank, a washer made of resiliently compressible material encircling said shank and disposed beneath said head to be compressed between the head and the workpiece when the fastener is driven into the workpiece, the diameter of the uncompressed washer being less than the inside diameter of said flange, said washer having at least one generally planar end disposed in a radial plane prior to initial compression of the washer, the outer peripheral portion of said one end of said washer engaging an outer peripheral portion of the frustoconical underside of said head just prior to initial compression of said washer with such engagement causing the remaining portion of said one end of said washer to be spaced axially from the frustoconical underside of said head whereby a space is defined between the washer and the underside of said head, and a single annular rib projecting downwardly from the underside of said head and into said space to divide said space into a single inner cavity and a single outer cavity, said rib being coaxial with and spaced radially outwardly from said shank so as to engage said one end of said washer between the inner and outer peripheral portions thereof, said rib having inner and outer sides respectively facing inwardly toward and outwardly from said shank and each inclined at an acute angle relative to a plane disposed transversely of said shank whereby driving of the fastener into the workpiece causes said rib to exert a force effecting a sealing circle between the washer and the workpiece and at the same time causes said inner side of said rib to urge the compressible material at the inner peripheral portion of said washer inwardly into engagement with said shank with some of such compressible material flowing into and substantially filling said inner cavity, driving of said fastener also causing the outer side of said rib to urge the compressible material at the outer peripheral portion of said washer outwardly into engagement with said flange with some of such compressible material flowing into and substantially filling said outer cavity.

2. A fastener as defined in claim 1 in which said washer is substantially cylindrical and includes two generally planar and substantially parallel ends.

* * * * *